United States Patent

[11] 3,593,900

[72] Inventor Toshio Doi
Hamamatsu, Japan
[21] Appl. No. 831,531
[22] Filed June 9, 1969
[45] Patented July 20, 1971
[73] Assignee Victor Company of Japan Limited
Yokohama, Japan
[32] Priority June 11, 1968, July 5, 1968
[33] Japan
[31] 43/39682 and 43/46541

[54] DEVICE FOR STABILIZING THE OPERATION OF MAGNETIC TAPE
10 Claims, 8 Drawing Figs.

[52] U.S. Cl. .......... 226/51, 226/178, 226/108
[51] Int. Cl. .......... B65h 17/20
[50] Field of Search .......... 226/51, 178, 188, 108

[56] References Cited
UNITED STATES PATENTS
3,342,950 9/1967 Schwarz et al. .......... 226/188 (X)

*Primary Examiner*—Allen W. Knowles
*Assistant Examiner*—Gene A. Church
*Attorney*—Louis Bernat

ABSTRACT: The invention relates to a device for stabilizing the operation of magnetic tape for a magnetic recording and reproducing apparatus, of the so-called dual capstan type. A magnetic tape is operated by two capstans driven by a single capstan motor, acting through two belts. When the rate of rotation of the capstan motor is varied so as to vary the rate of movement of the magnetic tape, pinch rollers are caused to move apart from the respective capstans until the rate of rotation of each capstan is stabilized, whereby loosening of the magnetic tape can be prevented.

INVENTOR
TOSHIO DOI

BY Louis Bernat

ATTORNEY

INVENTOR
TOSHIO DOI
BY Louis Bernat
ATTORNEY

INVENTOR
TOSHIO DOI
BY Louis Bernat
ATTORNEY

DEVICE FOR STABILIZING THE OPERATION OF MAGNETIC TAPE

The present invention relates to devices for stabilizing the operation of magnetic tape for a magnetic recording and reproducing apparatus in general.

In particular, the invention deals with a device for stabilizing the operation of magnetic tape for a magnetic video signal recording and reproducing apparatus of the so-called dual capstan type. A magnetic tape is operated by two capstans driven by a single capstan motor, acting through two belts.

Generally, in a magnetic recording and reproducing apparatus of the so-called dual capstan type, in two capstans are simultaneously driven by a single capstan motor acting through belts. The capstans drive a magnetic tape. If the rate of rotation of the capstan motor is varied so as to vary the rate of movement of the magnetic tape, a slippage will likely occur between the belts and pulleys on which the belts are mounted, because the change in the rate of rotation is transmitted to the two capstans through the belts. This causes the magnetic tape to move in a manner different from that in which the magnetic tape moves when the capstan motor rotates at a constant rate of rotation. If the two capstans rotate at different rates the portion of magnetic tape disposed between them becomes loosened. l This phenomenon takes place particularly when the program recorded on the magnetic tape is reproduced in slow motion from a normal motion recording.

A principal object of the present invention is to provide a device for stabilizing the operation of magnetic tape for a magnetic recording and reproducing apparatus of the dual capstan type which operates the magnetic tape in a stable manner without allowing the portion of the magnetic tape between the two capstans to become loosened when the rate of movement of the magnetic tape is varied.

Another object of the invention is to provide a device for stabilizing the operation of magnetic tape for a magnetic recording and reproducing apparatus. The device causes the pinch rollers to move away from the respective capstans for a short time interval until the rate of rotation of each capstan is stabilized when the rate of movement of the magnetic tape is varied, so that no loosening of the magnetic tape may occur.

Another object of the invention is to provide a device for stabilizing the operation of magnetic tape for a magnetic recording and reproducing apparatus. The pinch rollers move back into contact with the respective capstans after loosening of the magnetic tape is prevented by moving the pinch rollers away from the respective capstans for a short time interval. This pinch roller motion temporarily stops the movement of the magnetic tape when the rate of rotation of the capstan motor is varied.

Still another object of the invention is to provide a device for stabilizing the operation of magnetic tape for a magnetic recording and reproducing apparatus which enables magnetic tape motion in a stable manner without causing loosening of the magnetic tape when the rate of movement of the magnetic tape is reduced from a constant rate or returned to the constant rate from a reduced rate.

Additional objects as well as features and advantages of the invention will become apparent from the description set forth hereinafter when considered in conjunction with the accompanying drawings, in which.

Figures 3, 4, 5:
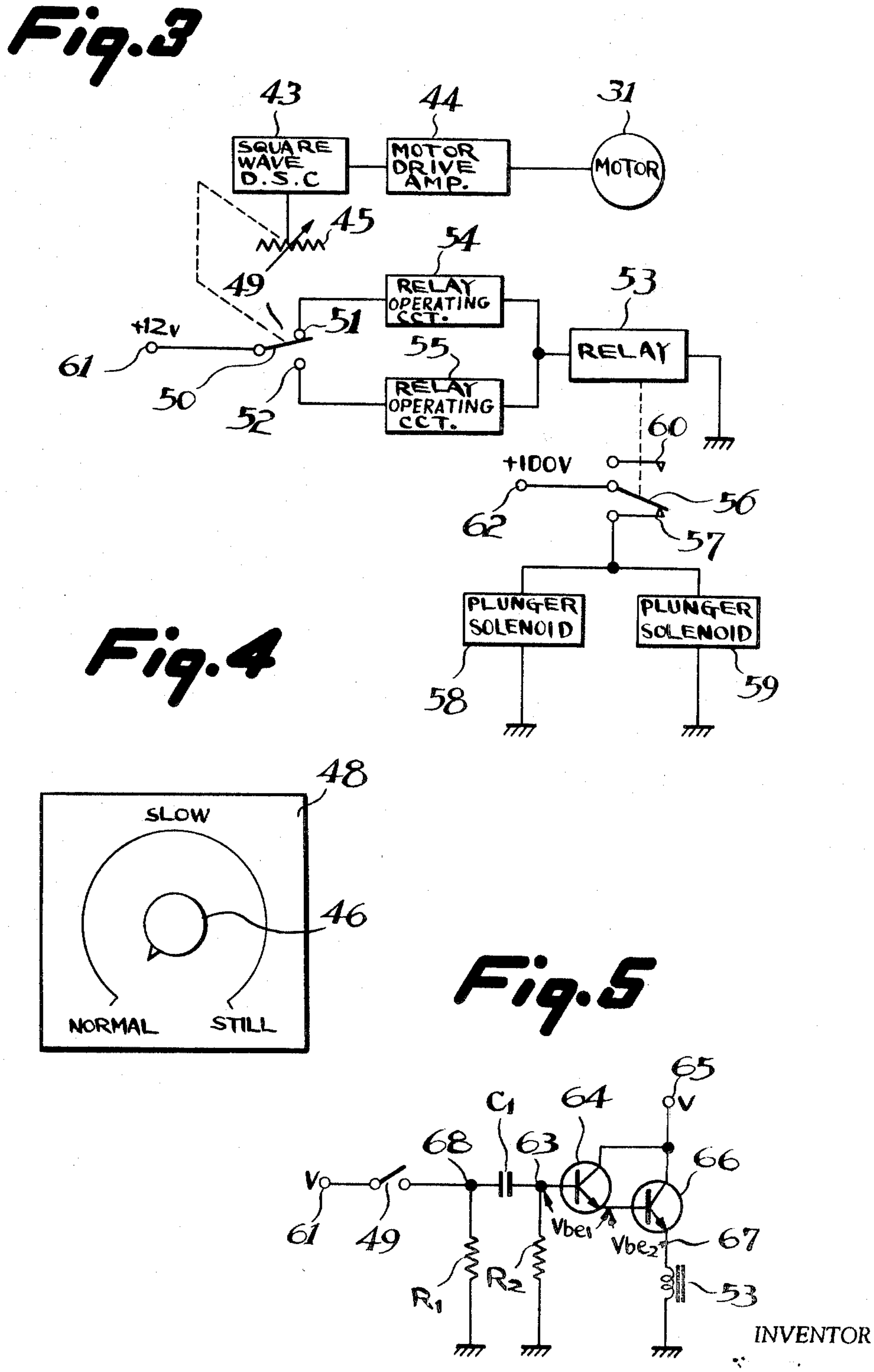
FIG. 3 is a block diagram of one circuit embodiment for use in the device according to this invention.
FIG. 4 is a plan view of an indication plate of the variable resistor operating portion.
FIG. 5 is a theoretical circuit diagram of one embodiment of the relay operating unit shown in FIG. 3.
Figure 6A:
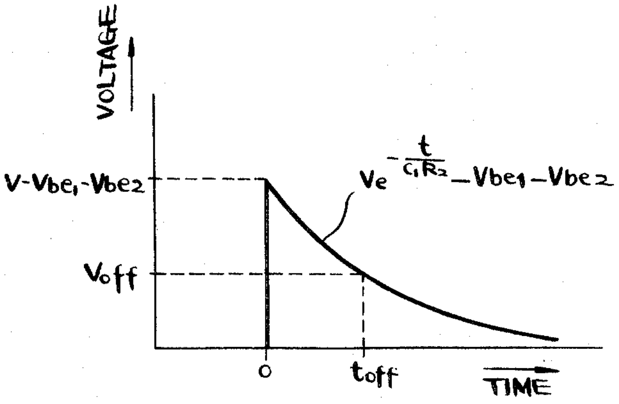
Figure 6B:
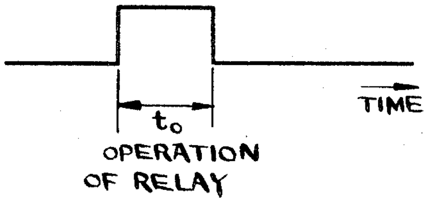
Figure 7:
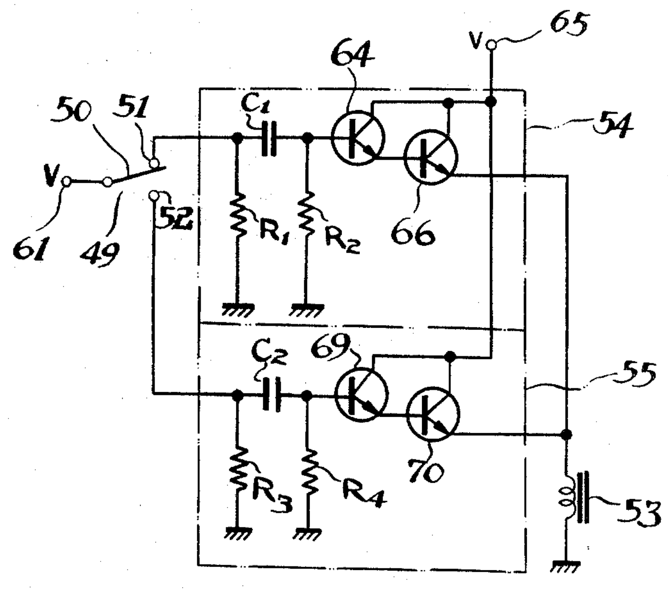

FIGS. 6*a* and 6*b* are two graphical views in explanation of the operation of the relay operating unit shown in FIG. 5; and FIG. 7 is a circuit diagram, in practical form, of another embodiment of the relay operating unit shown in FIG. 3.

Figure 1:
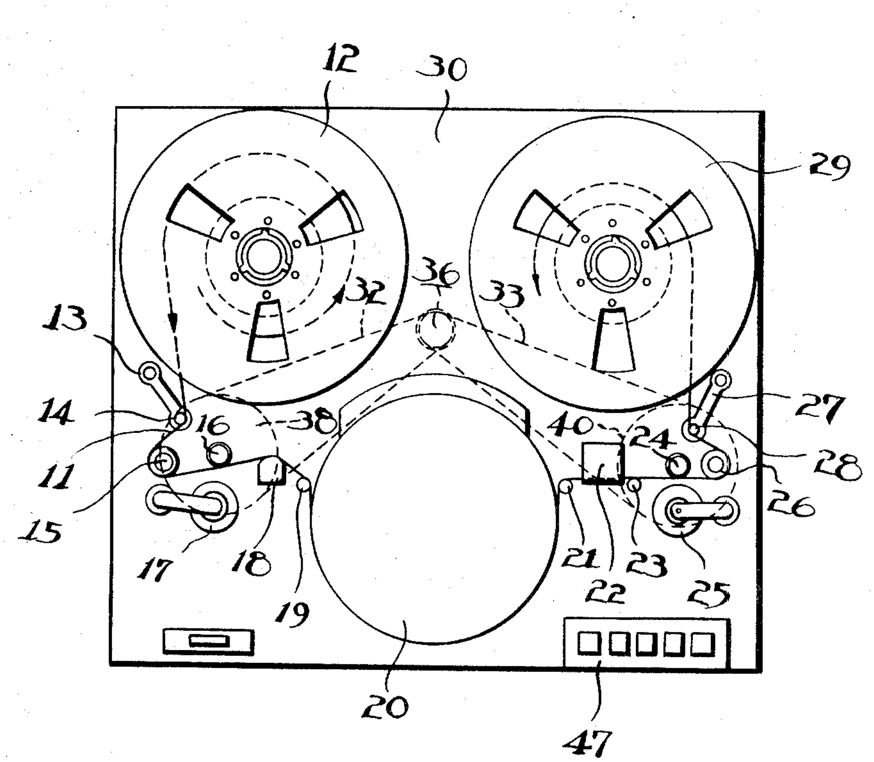
FIG. 1 is a plan view of an exemplary magnetic video signal recording and reproducing apparatus in which the device according to this invention can be incorporated.

FIG. 1 shows an example of the magnetic video signal recording and reproducing apparatus in which the device according to this invention can be incorporated. A magnetic tape 11 is unwound from a supply reel 12 and moved past a roller 14 having a tension arm 13, and a guide roller 15. Roller !5 is held between a rotating first capstan 16 and a first pinch roller 17. Then the tape is brought into contact with a fixed magnetic erasing head 18 for erasing video signals recorded on the magnetic tape. The tape is moved past a first guide pole 19, moved in an oblique path about substantially one-half the circumference of a guide drum 20 having built-in rotary magnetic heads, subsequently to be described for recording and reproducing video signals. After such recording or reproducing, the tape is moved past a second guide pole 21, brought into contact with a fixed magnetic head block 22 for recording and reproducing audio and control signals, past a third guide pole 23, held between a rotating second capstan 24 and a second pinch roller 25, past a guide roller 26, a roller 28 having a tension arm 27, and moved in the direction of the arrow to be wound on a takeup reel 29.

The rotary magnetic heads (not shown) build-in the guide drum 20 are, for example, two recording and reproducing magnetic heads disposed in positions diametrically opposed to each other on the peripheral edge of a rotating member coaxial with the guide drum. This member is rotatable in a plane normal to the axis of the guide drum.

Figure 2:
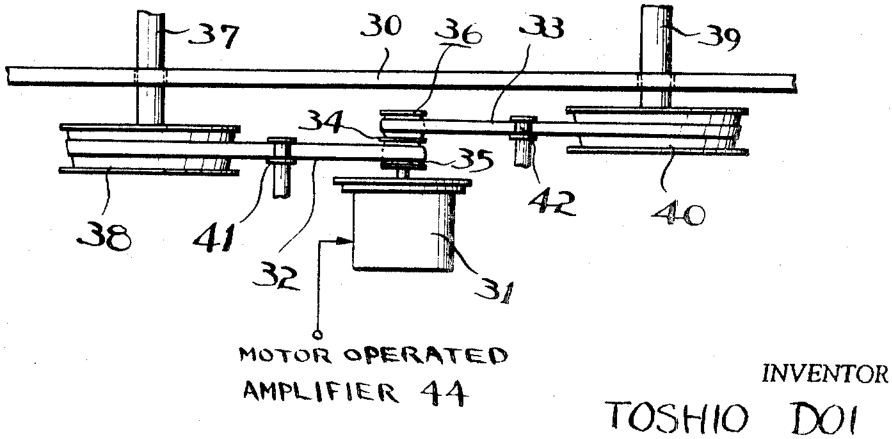
FIG. 2 is a side view, with certain parts being omitted, of the device shown in FIG. 1 in explanation of the relationship between belts and pulleys used in the device.

The mechanism for operating the magnetic tape 11 is disposed on the upper surface of a baseplate 30. Mounted on the underside is a mechanism for operating the two capstans 16 and 24 by a single motor 31 acting through two belts 32 and 33, as shown in FIG. 2.

The mechanism for operating the two capstans will now be explained.

The motor 31 has a rotary shaft to which is fixed a pulley assembly 36 consisting of two pulleys 34 and 35, mounted one over the other to turn as a unit. The first capstan 16 is mounted on a rotary shaft 37 having a lower end with a first flywheel 38, which also serves concurrently as a pulley. The second capstan 24 is mounted a rotary shaft 39 having a lower end with a second flywheel 40 which also serves concurrently as a pulley. The first belt 32 is mounted between the lower pulley 35 and the flywheel or pulley 38 while the second belt 33 is mounted between the upper pulley 34 and the flywheel or pulley 40. Guide rollers 41 and 42 are rotatably mounted by conventional means to press against the belts 32 and 33 respectively from the outside.

The rotation of the pulley assembly 36 is transmitted to the first capstan 16 and the second capstan 24 through the belts 32 and 33, respectively. The lower pulley 35 has a diameter which is slightly smaller than the diameter of the upper pulley 34. Thus, the second capstan 24, disposed on the takeup side of the guide drum 20, has a slightly higher rate of rotation than the first capstan 16 disposed on the tape supply side of the guide drum 20. This speed differential maintains tension in the portion of magnetic tape between the two capstans 16 and 24. Since a slippage occurs between the belt 32 and lower pulley 35 and flywheel or pulley 38 and between the belt 33 and upper pulley 34 and flywheel or pulley 40, the tension of the portion of the magnetic tape between the two capstans 16 and 24 is maintained at a proper constant level.

In a magnetic video signal recording and reproducing apparatus constructed as aforementioned, the rate of rotation of the motor 31 may be varied to vary the rate of movement of the magnetic tape. For example, this variation may reproduce the recorded program in slow motion. Slippage occurs between the belts 32, 33 and the flywheels or pulleys 38, 40 during the change in the rate of rotation of the motor. Thus, the power transmitted to the two capstans 16 and 24 through the belts 32 and 33 respectively, will as a result of the slippage which occurs between the belts 32, 33 and the flywheels or pulleys 38, 40, respectively, when the motor 31 is rotated at a constant rate. This causes nonuniform changes in the rates of rotation of the first capstan 16 and second capstan 24, though for a very short time. As a result, the portion of the magnetic tape 11 between the two capstans 16 and 24 will be loosened if the increase in the rate of rotation of the first capstan 16 is larger than the increase in the rate of rotation of the second capstan 24. A higher tension will be applied to the magnetic tape if the increase in the rate of rotation of the second capstan 24 is larger than the increase in the rate of rotation of the first capstan 16.

The present invention obviates this disadvantages. The invention provides means for stabilizing the operation of magnetic tape in a mechanism for rotating the capstans 16 and 24 by the capstan motor 31 acting through the two belts 32 and 33. According to the invention, when the rate of movement of the magnetic tape is varied by varying the rate of operation of the capstan motor, the pinch rollers are moved away from the respective capstans for a very short time interval (about 0.5 second in the embodiment described). This pinch roller motion temporarily stops the movement of the magnetic tape for a very short time interval and precludes a change in the rates of rotation of the capstans as a result of the change in the rate of rotation of the capstan motor 31, particularly as the rate of rotation of the capstan motor 31 is reduced from a constant rate or returned from a reduced rate to the constant rate. Then, the pinch rollers are again moved into contact with the respective capstans. The magnetic tape 11 is interposed therebetween. Thus, the magnetic tape 11 moves in a stable manner after the change in the rates of rotation of the capstans.

FIG. 3 is a block diagram of one embodiment of the device for stabilizing the operation of the magnetic tape according to the present invention. The output of a 120 Hz. square wave generator 43 is amplified at a motor operated amplifier 44 and then supplied to the motor 31 for rotating the pulley assembly 36. The rate of rotation of the motor 31 can be varied by varying the bias current of the square wave generator 43. The bias is applied through a variable resistor 45 electrically connected to the square wave generator 43. The operation of varying the rate of rotation of the motor 31 is performed by manipulating a knob 46 connected to the variable resistor 45 (FIG. 4). Mounted on an operating panel 47 on the base plate 30 is an indication plate 48 marked "normal," "slow" and "still" in positions corresponding to normal reproduction, slow-motion reproduction, and still reproduction. The knob 46 can be rotated to set the variable resistor 45 to cause any one of these operations, as desired.

When the knob 46 is in a normal position, the resistance value of the variable resistor 45 is zero, and the motor 31 rotates at a constant rate. A movable contact 50 of a switch 49 is actuated in association with the knob 46. Contact 50 is kept in engagement with a fixed contact 51 of the switch 49, which also has another fixed contact 52. The first fixed contact 51 is connected to a first relay operating circuit 54 for operating a relay 53 for about 0.5 second. The second fixed contact 52 is connected to a second relay operating circuit 55 for operating the relay 53 for about 0.5 second. If a direct current of ±12 volts, for example, is applied to an input terminal, 61, it is normally applied to the first relay operating circuit 54 through said movable contact 50 and said first fixed contact 51. Then the circuit 54 and relay 53 are rendered operative for about 0.5 second and automatically rendered inoperative after said time elapses.

If the knob 46 is turned from the normal position to a slow position, then the resistance value of the variable resistor 45 is increased. The rate of rotation of the motor 31 is reduced below the constant rate of rotation (the minimum rate of rotation for slow motion reproduction being about 1/20 the constant rate of rotation). At the same time, the movable contact 50 of the switch 49 is brought out of engagement with the first fixed contact 51 and into engagement with the second fixed contact 52. The DC voltage is applied to the second relay operating circuit 55 which is rendered operative for about 0.5 second to operate the relay 53 for about 0.5 second. The relay 53 has a movable contact 56 to which a voltage of +100 volts, for example, is applied through a voltage applying terminal 62. A fixed contact 57 is connected to plunger solenoids 58 and 59 for operating the pinch rollers 17 and 25, respectively. When the relay 53 remains inoperative, a voltage of +100 volts is supplied to the plunger solenoids 58 and 59 through the movable contact 56 and fixed contact 57 of the relay 53.

If the relay 53 is operated, then the movable contact 56 is brought out of engagement with the fixed contact 57 and into engagement with a second fixed contact 60 of the relay 53. This cuts off the supply of current to the plunger solenoids 58 and 59 for about 0.5 second during which the relay 53 remains operative. The pinch rollers 17 and 25 can be moved away from the respective capstans 16 and 24. The second relay operating circuit 55 is automatically rendered inoperative after being rendered operative for about 0.5 second. The movable contact 56 of the relay 53 is thus brought back into engagement with the first fixed contact 57 and the pinch rollers 17 and 25 are returned into contact with the respective capstans 16 and 24, again to press against the same. Thus, the magnetic tape 11 is caused to move in a predetermined direction. If the knob 46 is turned in a reverse direction from the slow position to the normal position, the rate of rotation of the motor 31 is returned to the constant rate. At the same time, the movable contact 50 of the switch 49 is brought out of engagement with the fixed contact 52 and into engagement with the fixed contact 51. The first relay operating circuit 54 is rendered operative for about 0.5 second to actuate the relay 53 for about 0.5 second. Accordingly, the movable contact 56 of the relay 53 is again brought into engagement with the fixed contact 60. The pinch rollers 17 and 25 are moved away from the respective capstans 16 and 24 for about 0.5 second. After about 0.5 second has elapsed, the pinch rollers 17 and 25 are automatically brought back into contact with the respective capstans 16 and 24 to again press against the same and cause the magnetic tape 11 to move in a predetermined direction as described hereinabove.

The relay operating circuits described hereinabove will be explained in detail with reference to FIGS. 5 to 7. FIG. 5 is a theoretical circuit diagram of one embodiment of the relay operating circuit. A series circuit consisting of the switch 49, capacitor $C_1$, and resistor $R_2$ is connected to the voltage applying terminal 61 to which a DC voltage V is applied. A resistor $R_1$ is connected between the junction 68 of the switch 49 and capacitor $C_1$ and the ground. Connected to the junction 63 of the capacitor $C_1$ and resistor $R_2$ is the base of a first transistor 64. The collector is connected to a voltage applying terminal 65 to which a DC voltage V is applied. The emitter is connected to the base of a second transistor 66. The collector of the second transistor 66 is also connected to the voltage applying terminal 65, and the emitter thereof is connected to the relay 53. The relay 53 is connected to the emitter of the second transistor 66 at a point designated 67.

The DC voltages V applied to the terminals 61 and 65 are slightly higher in value than the rated voltage. The resistance value of the resistor $R_2$ is selected such that it is slightly smaller than the input resistance value of the first transistor 64, as seen from the point 63. The resistor $R_1$ is mounted for closing the circuit in such a manner that the capacitor $C_1$ is permitted to discharge after the switch 49 is opened.

The operation of the circuit composed as aforementioned will be explained. Upon the closing of the switch 49, the voltage V is applied to the junction 63 as the switch is closed. Accordingly, a voltage equal to the voltage V minus the voltage $V_{be1}$ across the base and emitter of the transistor 64 and the voltage $V_{be2}$ across the base and emitter of the transistor 66 is applied to the junction 67 between the circuit and relay 53. The resulting voltage operates the relay 53. The voltage at the junction 63 is reduced in accordance with the time constant of the capacitor $C_1$ and resistor $R_2$, the voltage at the junction 67 showing a similar change.

FIGS. 6*a* and 6*b* show the manner in which the voltage undergoes a change. The change in voltage at the junction 63 is given as $Ve{-}t/C_1R_2$ in accordance with the theory of transient phenomenon, wherein the symbol $t$ indicates the time elapsed after the switch 49 is closed. Accordingly, the change in voltage at the junction 67 is given as $Ve{-}t/C_1R_2-(V_{be1}+V_{be2})$. The voltage is gradually reduced during the time $t$ in a curve as shown in FIG. 6*a* . When the voltage at the junction 67 is reduced below the relay restoring voltage $V_{off}$, the relay 53 releases to its original condition.

Accordingly, the time $t_o$ elapses after the switch 49 is closed to actuate the relay 53. The relay 53 is thereafter automatically rendered inoperative after a period which can be given as $t_o=C_1R_2\log_e V/(V_{off}+V_{bel}+V_{be2})$. The relay 53 remains operative during the time $t_o$ as shown in FIG. 6*b*. The function of the transistors 64 and 66 is to change the impedance of the relay 53.

The use of the relay operating circuit described hereinabove permits the relay 53 to be operated for a predetermined time (very short time) following actuation of the switch 49 and then automatically releases the same after expiration of the time. If the relay operating circuits 54 and 55 shown in FIG. 3 are each of the type described above, it will be possible to attain the objects of the present invention.

FIG. 7 is a circuit diagram of the relay operating circuits actually incorporated in the device according to this invention. In FIG. 7, the first relay operating circuit 54 is composed of the resistors $R_1$ and $R_2$, capacitor $C_1$ and transistors 64 and 66. The same manner as the relay operating circuit shown in the theoretical circuit diagram of FIG. 5. Connected in parallel is the second relay operating circuit 55 composed of resistors $R_3$ and $R_4$, capacitor $C_2$ and transistors 69 and, again in the same manner as the relay operating circuit shown in FIG. 5. The terminal 61 can be connected to either the circuit 54 or circuit 55 through the switch 49. The relay 53 is connected to the emitters of the transistors 66 and 70, and the collectors of the transistors 64, 66, 69 and 70 are connected to the terminal 65.

The switch 49 is actuated and the movable contact 50 thereof is brought into engagement with either the fixed contact 51 on the side of the first relay operating circuit 54 or the fixed contact 52 on the side of the second relay operating circuit 55. The closed relay operating circuit will be rendered operative as soon as the switch is actuated. The relay 53 is thus held operated for a predetermined time.

In the embodiment described, the time during which the relay 53 is rendered operative is no longer than about 0.5 second because the values of the resistors $R_1$, $R_2$, $R_3$ and $R_4$ and the capacitors $C_1$ and $C_2$ are selected as follows:

| | |
|---|---|
| Resistors $R_1$, $R_3$ | 4.7 KΩ |
| Resistors $R_2$, $R_4$ | 22.0 KΩ |
| Capacitors $C_1$, $C_2$ | 10.0 λF |

The first relay operating circuit 54 and second relay operating circuit 55 are constructed as aforementioned and incorporated in a magnetic video signal recording and reproducing apparatus of the dual capstan type. The two capstans are operated by a single capstan motor acting through two belts to operate a magnetic tape. It will be evident that the magnetic tape can be operated in a stable manner when, for example, the rate of movement of the magnetic tape is varied to effect reproduction of the recorded program in slow motion by varying the rate of rotation of the capstan motor.

From the description set forth hereinabove as well as the block diagram of FIG. 3 (showing the device for stabilizing the operation of magnetic tape according to this invention), it will be evident that, particularly when the rate of rotation of the capstan motor is reduced from a constant rate or returned from a reduced rate to the constant rate, the pinch rollers can be moved away from the respective capstans for about 0.5 second. This is long enough for the rate of rotation of each capstan to be stabilized. The movement of the magnetic tape during the same time interval, prevents a loosening of the magnetic tape that might be caused by nonuniform changes in the rates of rotation of the capstans. This loosening is caused by the phenomenon of slippage occurring in the rotation transmission system composed of belts and pulleys. It will also be evident that the pinch rollers are brought into contact with the respective capstans to press against the same. The magnetic tape moves in a stable manner when the influences of nonuniform changes in the rate of rotation of the capstans are removed and no loosening of the magnetic tape is liable to occur.

While the present invention has been described with reference to a preferred embodiment thereof, it is to be understood that the invention is not limited to the specific form of the embodiment described, and that many changes and modifications may be made therein without departing from the spirit and scope of the invention.

I claim:

1. A device for stabilizing the transportation of magnetic tape comprising an electric motor, means including two capstans rotated by said electric motor acting through two rotation transmission members to thereby move said magnetic tape, means including two pinch rollers each pressing against one of said capstans with said magnetic tape being interposed therebetween, speed control means for varying the rate of rotation of said electric motor, switching means operated in association with said speed control means for varying the rate of rotation of the electric motor, a relay, time delay means connected between said switching means and said relay for keeping said relay in a operated state for a predetermined time interval when a control voltage is applied through said switching means, and means for moving said pinch rollers away from the respective capstans while said relay remains operated and for moving said pinch rollers into contact with the respective capstans to press against the same while said relay is released.

2. A device for stabilizing the transportation of magnetic tape comprising an electric motor, two capstans which are rotated by said electric motor through two rotation transmission members to thereby move a magnetic tape, two pinch rollers each pressing against one of said capstans with said magnetic tape being interposed therebetween, means for varying the rate of rotation of said electric motor, said means for varying the rate of rotation of said electric motor including a variable resistor electrically connected to a square wave generator for generating signals applied to said electric motor for varying the bias voltage of said generator, switching means adapted to operate in association with said means for varying the rate of rotation of the electric motor, a relay connected in series with relay operating circuits to which a DC voltage is applied through said switching means, and means adapted to move said pinch rollers away from the respective capstans while said relay remains operated and move said pinch rollers into contact with the respective capstans to press against the same while said relay releases.

3. A device for stabilizing the transportation of magnetic tape comprising an electric motor, two capstans which are rotated by said electric motor through two rotation transmission members to thereby move a magnetic tape, two pinch rollers each pressing against one of said capstans with said magnetic tape being interposed therebetween, means for varying the rate of rotation of said electric motor, switching means adapted to operate in association with said means for varying the rate of rotation of the electric motor, a relay connected in series with a relay operating circuits to which a DC voltage is applied through said switching means, means adapted to move said pinch rollers away from the respective capstans while said relay remains operated and move said pinch rollers into contact with the respective capstans to press against the same while said relay releases, said relay causing the pinch rollers to move away from the respective capstans for a short time interval until the rates of rotation of the capstans are stabilized and then to automatically move into contact with the respective capstans to press against the same with the magnetic tape being interposed therebetween when the rate of rotation of said electric motor is varied by said means for varying the rate of rotation of said electric motor.

4. A device for stabilizing the transportation of magnetic tape as defined in claim 3 in which the time interval that elapses before the rates of rotation of the capstans are stabilized is about 0.5 second.

5. A device for stabilizing the transportation of magnetic tape comprising an electric motor, two capstans which are rotated by said electric motor through two rotation transmission members to thereby move a magnetic tape, two pinch rollers each pressing against one of said capstans with said magnetic tape being interposed therebetween, means for varying the rate of rotation of said electric motor, switching means adapted to operate in association with said means for varying the rate of rotation of the electric motor, a relay connected in series with relay operating circuits to which a DC voltage is applied through said switching means, said relay operating circuits being rendered operative for a short time interval and then automatically rendered inoperative when a DC voltage is applied thereto through said switching means, and means adapted to move said pinch rollers away from the respective capstans while said relay remains operated and move said pinch rollers into contact with the respective capstans to press against the same while said relay releases.

6. A device for stabilizing the operation of magnetic tape comprising an electric motor, two capstans which are rotated by said electric motor through two rotation transmission members to thereby move a magnetic tape, two pinch rollers each pressing against one of said capstans with said magnetic tape being interposed therebetween, means for varying the rate of rotation of said electric motor, a switch adapted to be actuated in association with said means for varying the rate of rotation of said electric motor, series circuits each composed of a capacitor and a resistor, means for applying a DC voltage to said series circuit through said switch, and a relay connected in parallel to said resistor, said relay being adapted to be rendered operative during the time interval in which the terminal voltage of said resistor is reduced to a predetermined voltage level in accordance with the time constant of said capacitor and resistor and automatically rendered inoperative after said time interval elapses, whereby the pinch rollers can be moved apart from the respective capstans while said relay remains operative and moved into contact with the respective capstans to press against the same while said relay remains inoperative.

7. A device for stabilizing the operation of magnetic tape as defined in claim 6 in which the time constant of said capacitor and said resistor are about 0.5 second.

8. A device for stabilizing the transportation of magnetic tape as defined in claim 1 in which said predetermined time interval required for the rates of rotation of the capstans to stabilize after the control voltage is applied through said switching means 9. A device for stabilizing the transportation of magnetic tape as defined in claim 1 in which said predetermined time interval is substantially 0.5 second.

10. A device for stabilizing the transportation of magnetic tape as defined in claim 1 in which said time delay means automatically releases said relay after elapse of the predetermined time interval.